US011256683B2

(12) United States Patent
Qu et al.

(10) Patent No.: US 11,256,683 B2
(45) Date of Patent: Feb. 22, 2022

(54) METHOD AND APPARATUS FOR INTEGRATING MULTI-DATA SOURCE USER INFORMATION

(71) Applicant: BEIJING GRIDSUM TECHNOLOGY CO., LTD., Beijing (CN)

(72) Inventors: Jingwei Qu, Beijing (CN); Guangzeng Zhang, Beijing (CN); Xueyi Li, Beijing (CN)

(73) Assignee: BEIJING GRIDSUM TECHNOLOGY CO., LTD., Beijing (CN)

(*) Notice: Subject to any disclaimer, the term of this patent is extended or adjusted under 35 U.S.C. 154(b) by 361 days.

(21) Appl. No.: 16/498,115

(22) PCT Filed: Mar. 27, 2018

(86) PCT No.: PCT/CN2018/080616
§ 371 (c)(1),
(2) Date: Sep. 26, 2019

(87) PCT Pub. No.: WO2018/177275
PCT Pub. Date: Oct. 4, 2018

(65) Prior Publication Data
US 2020/0104292 A1    Apr. 2, 2020

(30) Foreign Application Priority Data
Mar. 27, 2017  (CN) .......................... 201710188552.3

(51) Int. Cl.
*G06F 16/23*    (2019.01)
(52) U.S. Cl.
CPC ................... *G06F 16/2365* (2019.01)
(58) Field of Classification Search
CPC .................................................. G06F 16/2365

(Continued)

(56) References Cited

U.S. PATENT DOCUMENTS

2005/0223109 A1* 10/2005 Mamou ................ G06F 16/254
709/232
2011/0040703 A1*  2/2011 Iqbal .................. G06Q 30/0283
705/400

(Continued)

FOREIGN PATENT DOCUMENTS

CN      101262377 A      9/2008
CN      105207996 A     12/2015

(Continued)

OTHER PUBLICATIONS

International Search Report (in English and Chinese) and Written Opinion (in Chinese) issued in PCT/CN2018/080616, dated Jun. 28, 2018; ISA/CN.

*Primary Examiner* — James Trujillo
*Assistant Examiner* — Fariborz Khoshnoodi
(74) *Attorney, Agent, or Firm* — Harness, Dickey & Pierce, P.L.C.

(57) ABSTRACT

Disclosed are a method and apparatus for integrating multi-data source user information. The method involves: when an ID entry to be integrated matches more than one primary key in an ID graph, i.e. the ID entry to be integrated matches more than one internal ID entry in the ID graph, according to a first pre-set evaluation method, determining, from the more than one primary key, a first target primary key, the relevance thereof to the ID entry to be integrated being the highest; and integrating, into an internal ID entry corresponding to the first target primary key, the ID entry to be integrated, thereby finally effectively integrating an ID to be integrated matching more than one primary key/internal ID entry in an ID graph into the ID graph and associating same therewith.

16 Claims, 6 Drawing Sheets

(58) Field of Classification Search
USPC .......................................................... 707/691
See application file for complete search history.

(56) References Cited

U.S. PATENT DOCUMENTS

2011/0264921 A1* 10/2011 Keil ...................... H01L 23/576
713/189
2014/0074801 A1* 3/2014 Kacher ................. G06F 16/215
707/692
2014/0149180 A1* 5/2014 Yaseen ............... G06Q 30/0202
705/7.31

FOREIGN PATENT DOCUMENTS

CN 106230829 A 12/2016
CN 106372082 A 2/2017

* cited by examiner

METHOD AND APPARATUS FOR INTEGRATING MULTI-DATA SOURCE USER INFORMATION

The present application is the national phase of PCT International Patent Application PCT/CN2018/080616, filed on Mar. 27, 2018, which claims priority to Chinese Patent Application No. 201710188552.3, titled "METHOD AND APPARATUS FOR INTEGRATING MULTI-DATA SOURCE USER INFORMATION", filed on Mar. 27, 2017 with the Chinese Patent Office, both of which are incorporated herein by reference in their entireties.

FIELD

The present disclosure relates to the technical field of multi-channel user integration and user identification, and in particular to a method and a device for integrating multi-data source user information.

BACKGROUND

In Internet times, channels through which users access the Internet and the media are increasingly diversified and fragmented. One user usually has multiple different identities (IDs) in different channels/data sources. For example, one user may have different IDs in multiple data sources such as webpages and mobile phone Apps, and the user accesses the Internet or the media using the different IDs in the different data sources.

A great challenge is brought to the current internet marketing. Brand owners, e-commerce merchants, game merchants and the like cannot identify individual users respectively based on uniform IDs, and cannot track all behaviors and interactions of the individual users during a whole life cycle, which results in difficulty in precision marketing and good user management.

A key to solve the above problem is how to establish an ID graph (ID-Graph) to record, purge/integrate ID mapping relationships of all channels. In the conventional technology, different channels/data sources of user ID information are integrated to obtain a mapping relationship between user IDs of the different channels/data sources and form the ID-Graph. Different IDs associated with each other from different channels/data sources are identified to a same user according to the ID-Graph so as to achieve the precision marketing and the good user management. However, in a process of establishing the ID-Graph, in a case that a certain ID entry from a data source to be integrated into the ID-Graph matches the ID-Graph, the ID entry may cause two or more ID entries already existing in the ID-Graph to be associated with each other. For example, if two fields in the to-be-integrated ID entry respectively match two different ID entries already existing in the ID-Graph, the two ID entries are caused to be associated with each other. In this case, it is considered in the conventional technology that the to-be-integrated ID entry matches unsuccessfully, and the to-be-integrated ID entry is added to the ID-Graph as a new user (to continuously perfect the ID-Graph), rather than associating the to-be-integrated ID entry with any one of the two different ID entries matching the to-be-integrated ID entry.

In the case that the to-be-integrated ID entry causes multiple ID entries already existing in the ID-Graph to be associated with each other, the to-be-integrated ID entry generally belongs to a same user as a certain one of the ID entries already existing in the ID-Graph and matching the to-be-integrated ID entry. In this case, due to the solutions in the conventional technology, different IDs cannot be effectively associated and integrated, and a problem in association and identification for a multi-data source user due to ID fragmentization cannot be effectively solved.

SUMMARY

In view of this, an object of the present disclosure is to provide a method and a device for integrating multi-data source user information, to solve problems existing in the conventional technology, so as to further effectively solve a problem in association and identification for a multi-data source user due to ID fragmentization.

In order to solve the above technical problems, the following technical solutions are provided in the present disclosure.

A method for integrating multi-data source user information is provided. The method includes: acquiring to-be-integrated identity ID information provided by a to-be-integrated data source among multiple data sources, where the to-be-integrated ID information includes one or more to-be-integrated ID entries; judging, for each of the to-be-integrated ID entries, whether an internal ID entry matching the to-be-integrated ID entry exists in a pre-created ID graph, where the ID graph is null or includes one or more internal ID entries respectively associated with primary keys in a one-to-one correspondence; acquiring, in a case that an internal ID entry matching a first to-be-integrated ID entry among the to-be-integrated ID entries exists, primary key information of the internal ID entry matching the first to-be-integrated ID entry; determining, in a case that the primary key information corresponding to the first to-be-integrated ID entry includes two or more primary keys, a first target primary key having the highest associativity with the first to-be-integrated ID entry from the two or more primary keys according to a first predetermined evaluation rule; and integrating the first to-be-integrated ID entry into an internal ID entry corresponding to the first target primary key.

Preferably, in the method, each of the to-be-integrated ID entries at least includes a unique user identification field for identifying a unique user in the to-be-integrated data source, and the judging, for each of the to-be-integrated ID entries, whether an internal ID entry matching the to-be-integrated ID entry exists in a pre-created ID graph includes: judging, for each of the to-be-integrated ID entries, whether an internal ID entry matching the to-be-integrated ID entry exists in the ID graph based on a matching result between ID fields in the to-be-integrated ID entry and fields in the internal ID entries in the ID graph, where the ID fields in the to-be-integrated ID entry include at least the unique user identification field for identifying a unique user in the to-be-integrated data source.

Preferably, in the method, determining the first target primary key having the highest associativity with the first to-be-integrated ID entry from the two or more primary keys according to the first predetermined evaluation rule includes: determining the first target primary key having the highest credibility from the two or more primary keys according to a first credibility evaluation rule, where a primary key having high credibility among multiple primary keys matching a to-be-integrated ID entry has high associativity with the to-be-integrated ID entry.

Preferably, the method further includes: generating a new primary key for the first to-be-integrated ID entry in a case that no internal ID entry matching the first to-be-integrated ID entry exists; and adding an association relationship between the first to-be-integrated ID entry and the new primary key to the ID graph.

Preferably, in the method, each of the to-be-integrated ID entries at least includes a unique user identification field for identifying a unique user in the to-be-integrated data source, and before judging, for each of the to-be-integrated ID entries, whether an internal ID entry matching the to-be-integrated ID entry exists in a pre-created ID graph, the method further includes:

determining, in a case that the number of the to-be-integrated ID entries is two or more, whether a field value causing multiple to-be-integrated ID entries whose number exceeds a preset number to be associated with each other exists in the two or more to-be-integrated ID entries, where the field value is a value of a non-unique user identification field; and in a case that the field value causing multiple to-be-integrated ID entries whose number exceeds a preset number to be associated with each other exists, performing abnormality detection on each of the multiple to-be-integrated ID entries caused to be associated with each other due to the field value; and discarding, if it is detected that the to-be-integrated ID entry is normal, the field value in the normal to-be-integrated ID entry, and discarding, if it is detected that the to-be-integrated ID entry is abnormal, the abnormal to-be-integrated ID entry.

Preferably, in the method, after acquiring the primary key information of the internal ID entry matching the first to-be-integrated ID entry, the method further includes: in a case that the number of the first to-be-integrated ID entry is two or more, merging first to-be-integrated ID entries matching a same primary key, and/or merging first to-be-integrated ID entries having at least a same non-unique user identification field value and whose number does not exceed the preset number; and if the merged entry obtained after the merging process corresponds to multiple primary keys, determining a second target primary key having the highest associativity with the merged entry from the multiple primary keys corresponding to the merged entry according to a second predetermined evaluation rule, and associating the merged entry to the second target primary key, where the multiple primary keys corresponding to the merged entry exist in the ID graph and/or are newly generated and do not exist in the ID graph.

A device for integrating multi-data source user information is provided. The device includes a first acquiring unit, a judging unit, a second acquiring unit, a determining unit, and a first integrating unit, where the first acquiring unit is configured to acquire to-be-integrated ID information provided by a to-be-integrated data source among multiple data sources, where the to-be-integrated ID information includes one or more to-be-integrated ID entries;

the judging unit is configured to judge, for each of the to-be-integrated ID entries, whether an internal ID entry matching the to-be-integrated ID entry exists in a pre-created ID graph, where the ID graph is null or includes one or more internal ID entries respectively associated with primary keys in a one-to-one correspondence;

the second acquiring unit is configured to: in a case that an internal ID entry matching a first to-be-integrated ID entry among the to-be-integrated ID entries exists, acquire primary key information of the internal ID entry matching the first to-be-integrated ID entry;

the determining unit is configured to: in a case that the primary key information corresponding to the first to-be-integrated ID entry includes two or more primary keys, determine a first target primary key having the highest associativity with the first to-be-integrated ID entry from the two or more primary keys according to a first predetermined evaluation rule; and the first integrating unit is configured to integrate the first to-be-integrated ID entry into an internal ID entry corresponding to the first target primary key.

Preferably, in the device, each of the to-be-integrated ID entries at least includes a unique user identification field for identifying a unique user in the to-be-integrated data source, and the judging unit is further configured to: judge, for each of the to-be-integrated ID entries, whether an internal ID entry matching the to-be-integrated ID entry exists in the ID graph based on a matching result between ID fields in the to-be-integrated ID entry and fields in the internal ID entries in the ID graph, where the ID fields in the to-be-integrated ID entry include at least the unique user identification field for identifying a unique user in the to-be-integrated data source.

Preferably, in the device, the determining unit is further configured to: determine the first target primary key having the highest credibility from the two or more primary keys according to a first credibility evaluation rule, where a primary key having high credibility among multiple primary keys matching a to-be-integrated ID entry has high associativity with the to-be-integrated ID entry.

Preferably, the device further includes a second integrating unit. The second integrating unit is configured to: in a case that no internal ID entry matching the first to-be-integrated ID entry exists, generate a new primary key for the first to-be-integrated ID entry, and add an association relationship between the first to-be-integrated ID entry and the new primary key to the ID graph.

Preferably, in the device, each of the to-be-integrated ID entries at least includes a unique user identification field for identifying a unique user in the to-be-integrated data source, and the device further includes an abnormality processing unit. The abnormality processing unit is configured to: in a case that the number of the to-be-integrated ID entries is two or more, determine whether a field value causing multiple to-be-integrated ID entries whose number exceeds a preset number to be associated with each other exists in the two or more to-be-integrated ID entries, where the field value is a value of a non-unique user identification field; in a case that the field value causing multiple to-be-integrated ID entries whose number exceeds a preset number to be associated with each other exists, perform abnormality detection on each of the multiple to-be-integrated ID entries caused to be associated with each other due to the field value; and discard the field value in the normal to-be-integrated ID entry if it is detected that the to-be-integrated ID entry is normal, and discard the abnormal to-be-integrated ID entry if it is detected that the to-be-integrated ID entry is abnormal.

Preferably, the device further includes a merging processing unit. The merging processing unit is configured to: in a case that the number of the first to-be-integrated ID entry is two or more, merge first to-be-integrated ID entries matching a same primary key, and/or merge first to-be-integrated ID entries having at least a same non-unique user identification field value and whose number does not exceed the preset number; and if the merged entry obtained after the merging process corresponds to multiple primary keys, determine a second target primary key having the highest associativity with the merged entry from the multiple primary keys corresponding to the merged entry according to a second predetermined evaluation rule, and associate the merged entry to the second target primary key. The multiple primary keys corresponding to the merged entry exist in the ID graph and/or are newly generated and do not exist in the ID graph.

It can be seen from the above solutions that, with the method for integrating multi-data source user information provided in the present disclosure, in a case that a to-be-integrated ID entry matches two or more primary keys in the ID graph, that is, the to-be-integrated ID entry matches two or more internal ID entries in the ID graph, a first target primary key having the highest associativity with the to-be-integrated ID entry is determined from the two or more primary keys according to the first predetermined evaluation rule, and the to-be-integrated ID entry is integrated into the internal ID entry corresponding to the first target primary key having the highest associativity with the to-be-integrated ID entry. In this way, the to-be-integrated ID matching two or more primary keys/internal ID entries in the ID graph can be effectively integrated into and associated to the ID graph, thereby solving a problem existing in the conventional technology that such an entry (a to-be-integrated entry matching multiple internal ID entries in the ID graph) cannot be effectively integrated, and further achieving the effective identification for a multi-data source user.

DETAILED DESCRIPTION OF EMBODIMENTS

Next, technical terms used in the present disclosure and short forms or abbreviations thereof are explained for clarity and understanding.

ID-Set is used to denote an ID set, which is a set of ID fields in a data source that may be used for user identification;

ID-Graph is used to denote an ID graph, which is an ID structure for recording an association relationship between different ID information provided by different data sources; and v_id is used to denote a primary key in a default ID-Graph (which is initially null), and is not repeatable in the ID graph.

Preferred embodiments of the present disclosure are described below by way of examples in order to further understand the present disclosure. It should be noted that, the following description is only intended to further illustrate features and advantages of the present disclosure, and not to limit the claims of the present disclosure.

First Embodiment

According to a first embodiment of the present disclosure, a method for integrating multi-data source user information is provided. The method may be applied to a data management platform or a field requiring multi-channel user integration. In the method, ID information of multiple data sources is incorporated into an ID graph by performing an integrating and identifying process, and the ID information of the multiple data sources is continuously integrated and associated in the ID graph, to facilitate association and identification for a multi-data source user in a scenario such as precision marketing, crowd portrait analysis, or personnel tracking.

Figure 1:
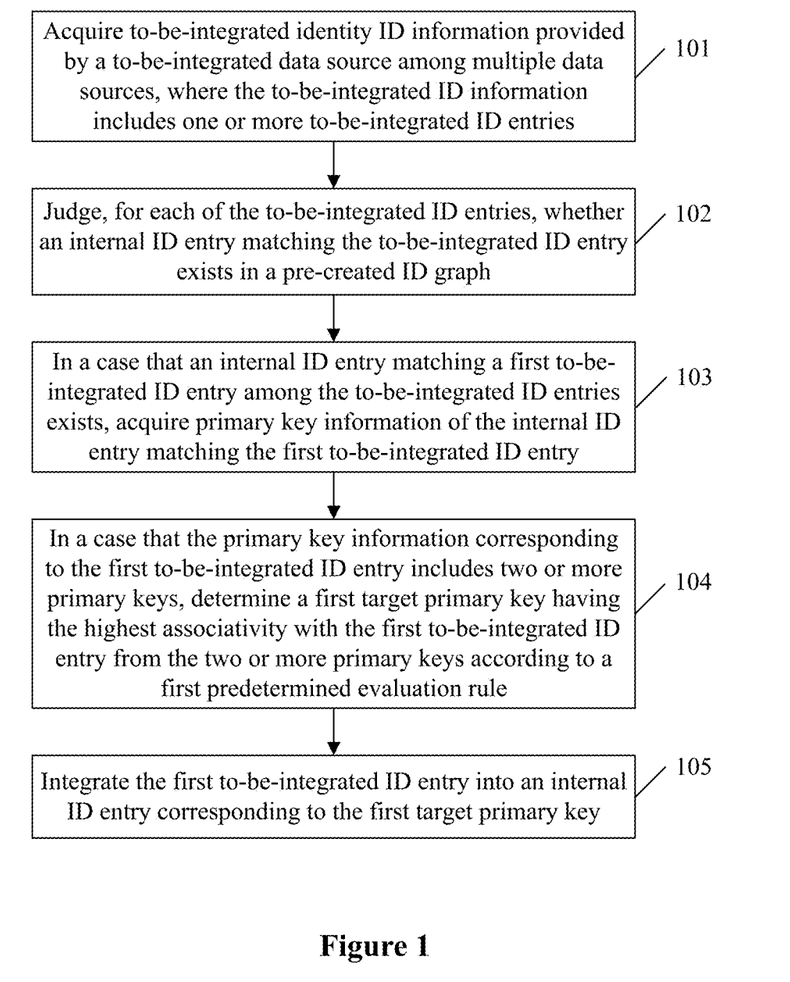
FIG. 1 is a flowchart showing a method for integrating multi-data source user information according to a first embodiment of the present disclosure.

Reference is made to FIG. 1, which is a flowchart showing a method for integrating multi-data source user information. The method may include the following steps 101 to 105.

In step 101, to-be-integrated identity ID information provided by a to-be-integrated data source among multiple data sources is acquired. The to-be-integrated ID information includes one or more to-be-integrated ID entries.

The multiple data sources may be data sources of multiple channels such as webpages and mobile phone Apps. The to-be-integrated ID information at least includes one to-be-integrated ID entry. Generally, under a same data source, each ID entry corresponds to one user, and different ID entries correspond to different users. Each ID entry includes one or more ID fields. The one or more ID fields at least include a unique user identification field for identifying a unique user in the data source, and may further include one or more non-unique user identification fields for auxiliarily identifying the user.

For example, in an ID entry "cookie_id3, imei1, phone1" provided in this embodiment, it is assumed that a field (cookie_id) corresponding to a field value cookie_id3 is a unique user identification field of the ID entry. In this case, two fields respectively corresponding to other field values imei1 and phone1 are non-unique user identification fields of the ID entry.

The to-be-integrated ID information provided by the to-be-integrated data source may be extracted by executing a script program in step 101. The to-be-integrated ID information may be an ID set (ID-set). The ID set may include at least one ID entry (ID record). For example, the ID set may be as follows.

cookie_id1, idfa1;
cookie_id1, imei1, mac1;
cookie_id2, imei2;
cookie_id3, imei1, phone1;
cookie_id4, imei1;
cookie_id5, idfa1.

Where a value of a filed cookie_id is data stored on a local user terminal by a server in a process that a user uses a browser, for the server to perform session tracking so as to identify the user, and field values of other fields such as idfa and imei are identification information of user terminal devices. In this embodiment, it is assumed that the field cookie_id is a unique user identification field, and other fields are non-unique user identification fields. In practice, the unique user identification field or the non-unique user identification field may be predetermined based on a role of the field in user identification (based on whether the field can identify a unique user).

In step 102, for each of the to-be-integrated ID entries, it is judged whether an internal ID entry matching the to-be-integrated ID entry exists in a pre-created ID graph. The ID graph is null or includes one or more internal ID entries respectively associated with primary keys in a one-to-one correspondence.

The ID graph is an ID structure for recording an association relationship between different ID information provided by different data sources. The ID graph is initially null. The different ID information provided by the different data sources is continuously incorporated and integrated into the ID graph to associate and integrate the different information provided by the different data sources. The ID information of different data sources having an association relationship is default to correspond to a same user. The ID information of different data sources having an association relationship is associated to a same primary key in the ID graph, and the ID information of different data sources associated to the same primary key in the ID graph may be identified as a same user. In this embodiment, an integrated ID entry corresponding to ID information of different data sources associated to a same primary key in the ID graph is referred to as an internal ID entry of the ID graph.

In a process that a to-be-integrated ID entry is incorporated and integrated into the ID graph, the to-be-integrated ID entry is identified based on existing internal ID entries of the ID graph, to determine whether an internal ID entry matching or associated with the to-be-integrated ID entry exists in the ID graph. Specifically, whether an internal ID entry matching or associated with the to-be-integrated ID entry exists in the ID graph may be determined by matching each ID field value in the to-be-integrated ID entry with each internal ID entry of the ID graph.

In a case that at least one ID field value in the to-be-integrated ID entry matches or is associated with an internal ID entry in the ID graph, it is considered that an internal ID entry matching or associated with the to-be-integrated ID entry exists in the ID graph. A certain ID field value in the to-be-integrated ID entry matching or being associated with a certain internal ID entry in the ID graph means that the ID field value in the to-be-integrated ID entry is the same as a certain field value in the internal ID entry in the ID graph.

In step 103, in a case that an internal ID entry matching a first to-be-integrated ID entry among the to-be-integrated ID entries exists, primary key information of the internal ID entry matching the first to-be-integrated ID entry is acquired.

The first to-be-integrated ID entry is included in the to-be-integrated ID entries provided by the to-be-integrated data source.

In a case that an internal ID entry matching or associated with the first to-be-integrated ID entry exists in the ID graph, a primary key of the internal ID entry matching the first to-be-integrated ID entry is acquired. If multiple field values in the first to-be-integrated ID entry match or are associated with different internal ID entries in the ID graph, primary keys of the different internal ID entries matching the first to-be-integrated ID entry are acquired.

Specifically, it is assumed that, a field value "cookie_id1" in a to-be-integrated ID entry "cookie_id1, idfa1" matches an internal ID entry corresponding to a primary key v_id1 in the ID graph (that is, v_id1 is associated with cookie_id1), and a field value "idfa1" in the to-be-integrated ID entry matches no internal ID entry in the ID graph. In this case, the primary key v_id1 is acquired in this step. In addition, it is assumed that, field values "cookie_id1" and "mac1" in a to-be-integrated ID entry "cookie_id1, imei1, mac1" respectively match internal ID entries corresponding to primary keys v_id1 and v_id3 in the ID graph, the primary keys v_id1 and v_id3 are acquired for the to-be-integrated ID entry in this step.

It should be noted that, in this embodiment, whether an internal ID entry matching each of ID fields in the to-be-integrated ID entry exists in the ID graph is based on a matching result between the ID fields in the to-be-integrated ID entry and fields in the internal ID entries in the ID graph. For example, if a filed A in a to-be-integrated ID entry 1 matches a field B in an internal ID entry 2 (that is, the field A and the field B have a same field value), it is considered that the filed A in the to-be-integrated ID entry 1 matches the internal ID entry 2.

In step 104, in a case that the primary key information corresponding to the first to-be-integrated ID entry includes two or more primary keys, a first target primary key having the highest associativity with the first to-be-integrated ID entry is determined from the two or more primary keys according to a first predetermined evaluation rule.

In this embodiment, the first predetermined evaluation rule is a first credibility evaluation rule.

In this embodiment, for a case that the first to-be-integrated ID entry causes two or more internal ID entries in the ID graph to be associated with each other, i.e., a case that the first to-be-integrated ID entry matches two or more internal ID entries in the ID graph and thus two or more primary keys corresponding to the first to-be-integrated ID entry are acquired, a first target primary key having the highest credibility is determined from the two or more primary keys according to a first credibility evaluation rule, as a primary key having the highest associativity with the first to-be-integrated ID entry in the ID graph. That is, a primary key having high credibility among the primary keys matching the first to-be-integrated ID entry has high associativity with the first to-be-integrated ID entry.

For example, in this embodiment, credibility of the primary keys matching the first to-be-integrated ID entry is measured and evaluated based on time instants at which the primary keys are respectively generated. Generally, a lately generated primary key has high real-time performance, thus is considered as having high credibility in this embodiment. Therefore, in this embodiment, the latest generated primary key among the primary keys matching the first to-be-integrated ID entry is determined as the primary key having the highest associativity with the first to-be-integrated ID entry.

For example, for the case that the to-be-integrated ID entry "cookie_id1, imei1, mac1" match the two primary keys v_id1 and v_id3 in the ID graph, if the primary key v_id3 is generated later (which may be read from an attribute of v_id3) than the primary key v_id1, it is considered that the to-be-integrated ID entry "cookie_id1, imei1, mac1" has higher associativity with v_id3 than v_id1.

It should be noted that, if the first to-be-integrated ID entry causes excessive internal ID entries in the ID graph to be associated with each other, it may be considered according to actual conditions (generally, the first to-be-integrated ID entry does not cause excessive internal ID entries to be associated with each other) that the first to-be-integrated ID entry is likely abnormal. In view of this, a maximum number of matched primary keys may be set (for example, may be set as two) in other embodiments of the present disclosure. In a case that the first to-be-integrated ID entry causes internal ID entries in the graph whose number exceeds the maximum number to be associated with each other, it is considered that the first to-be-integrated ID entry is abnormal, and the abnormal first to-be-integrated ID entry is discarded. The first to-be-integrated ID entry may be recorded in a pre-created abnormal ID database, and abnormality detection may be performed on the first to-be-integrated ID entry. For example, the first to-be-integrated ID entry may be artificially detected, to verify whether the first to-be-integrated ID entry is abnormal (only abnormality verification is performed, and the first to-be-integrated ID entry is still discarded even if the first to-be-integrated ID entry is detected to be not abnormal).

In step 105, the first to-be-integrated ID entry is integrated into an internal ID entry corresponding to the first target primary key.

After the first target primary key having the highest associativity with the first to-be-integrated ID entry in the ID graph is determined, the first to-be-integrated ID entry may be associated to the first target primary key, and information of the first to-be-integrated ID entry is integrated under the first target primary key. In the integration process, a same field value in the first to-be-integrated ID entry as that in an internal ID entry corresponding to the first target primary key having the highest associativity with the first to-be-integrated ID entry is no longer repeatedly stored.

If the first to-be-integrated ID entry matches only one primary key in the ID graph, the first to-be-integrated ID entry is directly associated to the primary key matching the first to-be-integrated ID entry, and ID information included in the first to-be-integrated ID entry is integrated into an internal ID entry corresponding to the primary key matching the first to-be-integrated ID entry.

In practice, user ID information of multiple data sources may be extracted and integrated periodically, to continuously maintain association information in the ID graph, so as to ensure real-time reference performance of the ID graph.

After to-be-integrated ID information provided by the to-be-integrated data source is integrated into the ID graph, a same user of different data sources can be identified based on user association information in the ID graph, thereby facilitating the association and identification for a multi-data source user in a scenario such as precision marketing, crowd portrait analysis, or personnel tracking. It can be seen from the above that, with the multi-data source user identifying method provided in the present disclosure, in a case that a to-be-integrated ID entry matches two or more primary keys in the ID graph, that is, the to-be-integrated ID entry matches two or more internal ID entries in the ID graph, a first target primary key having the highest associativity with the to-be-integrated ID entry is determined from the two or more primary keys according to the first predetermined evaluation rule, and the to-be-integrated ID entry is integrated into the internal ID entry corresponding to the first target primary key having the highest associativity with the to-be-integrated ID entry. In this way, the to-be-integrated ID matching two or more primary keys/internal ID entries in the ID graph can be effectively integrated into and associated to the ID graph, thereby solving a problem existing in the conventional technology that such an entry (a to-be-integrated entry matching multiple internal ID entries in the ID graph) cannot be effectively integrated, and further achieving the effective identification for a multi-data source user.

Second Embodiment

Figure 2:
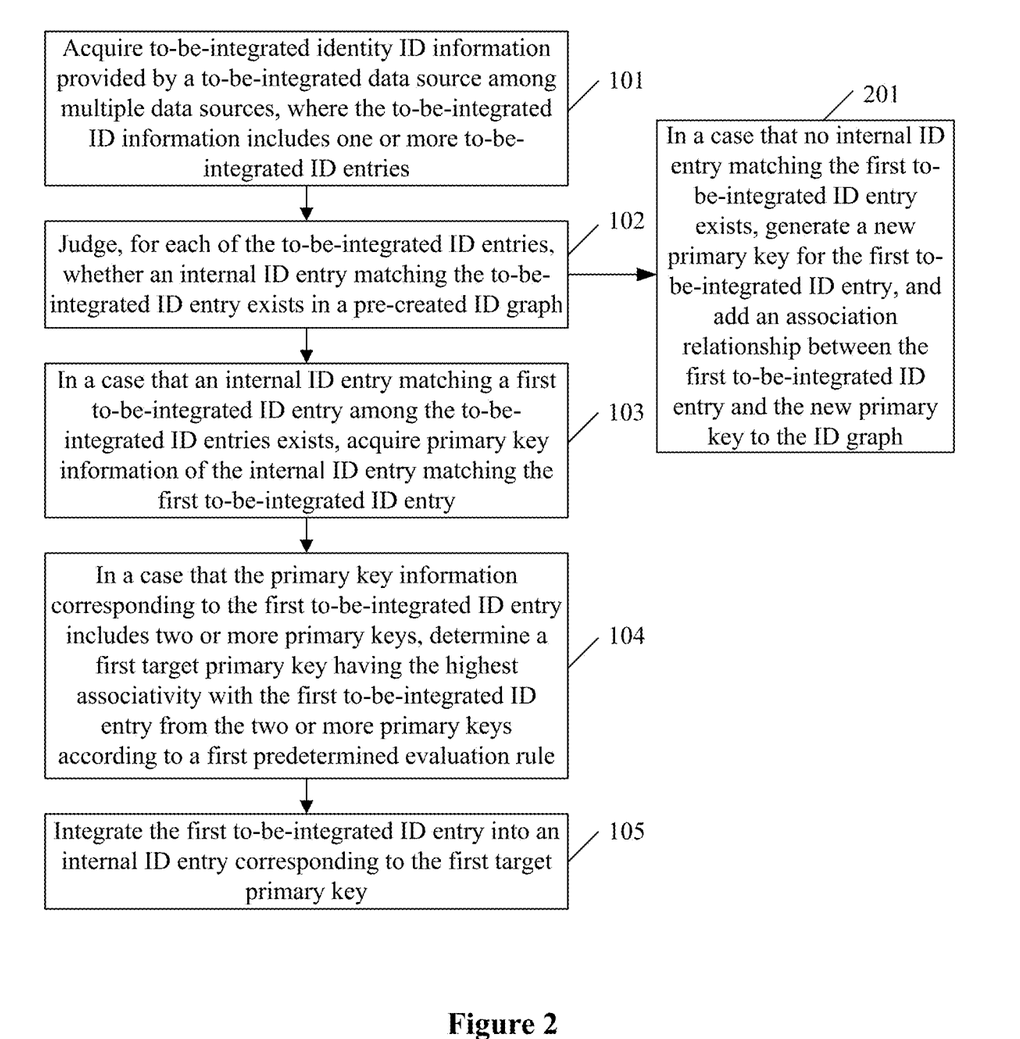
FIG. 2 is a flowchart showing a method for integrating multi-data source user information according to a second embodiment of the present disclosure.

In the second embodiment, reference is made to FIG. 2, which is a flowchart showing a method for integrating multi-data source user information. The method may further include the following step 201.

In step 201, in a case that no internal ID entry matching the first to-be-integrated ID entry exists, a new primary key is generated for the first to-be-integrated ID entry, and an association relationship between the first to-be-integrated ID entry and the new primary key is added to the ID graph.

Specifically, in the case that no internal ID entry matching the first to-be-integrated ID entry exists in the ID graph, it is indicated that association information of the first to-be-integrated ID entry in the multiple data sources is not yet established in the ID graph. In this case, a new primary key is generated and issued for the first to-be-integrated ID entry matching no internal ID entry, and the association relationship between the first to-be-integrated ID entry and the new primary key is added to the ID graph to continuously perfect the ID graph.

It is assumed that each of two fields in a to-be-integrated ID entry "cookie_id2, imei2" matches no internal ID entry/primary key in the ID graph, a new primary key, for example, v_id2, may be generated for the ID entry. The association relationship between the ID entry and the new primary key v_id2, for example, "cookie_id2, imei2, v_id2", may be added to the ID graph.

Third Embodiment

Figure 3:
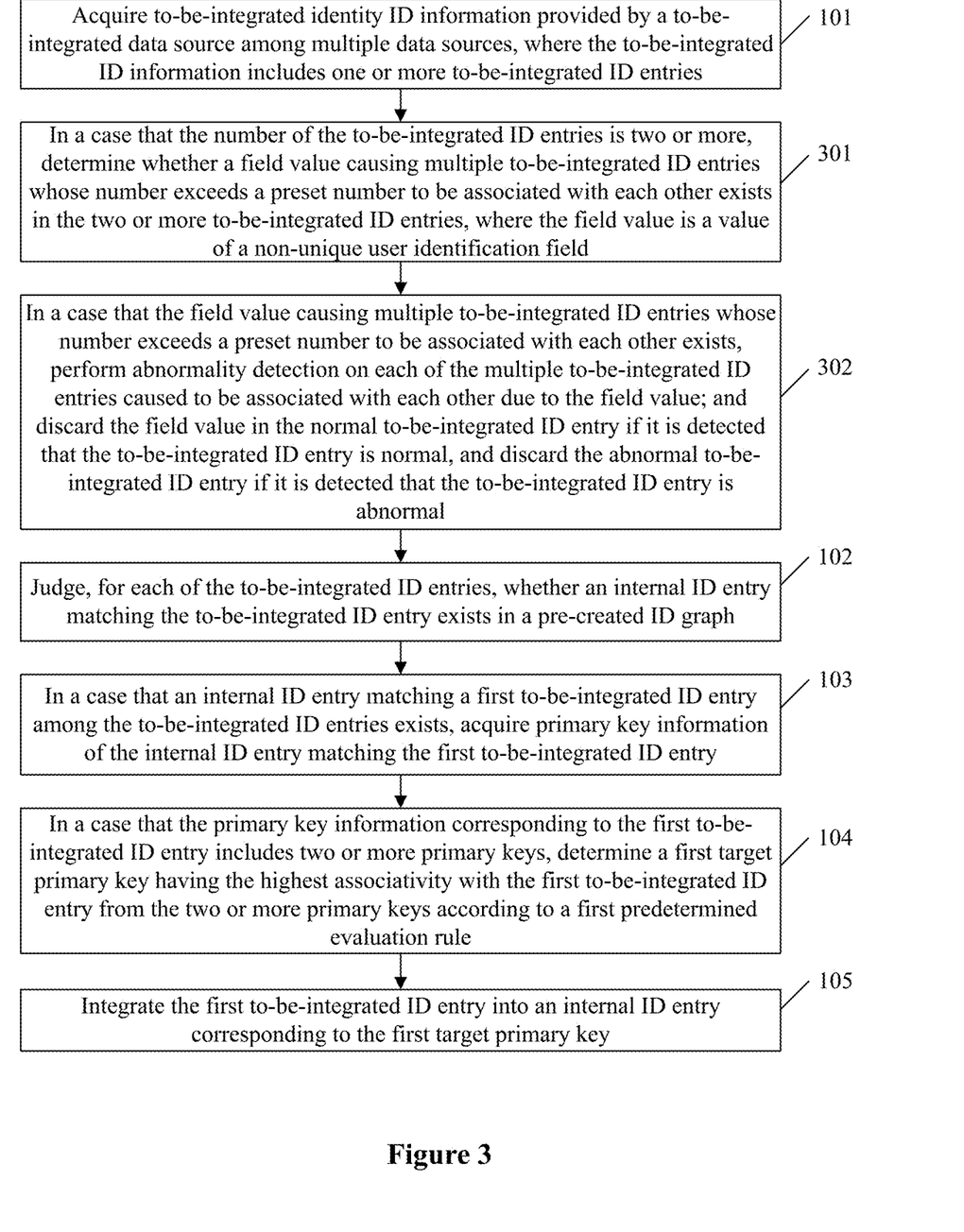
FIG. 3 is a flowchart showing a method for integrating multi-data source user information according to a third embodiment of the present disclosure.

In the third embodiment, reference is made to FIG. 3, which is a flowchart showing a method for integrating multi-data source user information. The method may further include the following steps 301 and 302 before step 102.

In step 301, in a case that the number of the to-be-integrated ID entries is two or more, it is determined whether a field value causing multiple to-be-integrated ID entries whose number exceeds a preset number to be associated with each other exists in the two or more to-be-integrated ID entries, where the field value is a value of a non-unique user identification field.

In step 302, in a case that the field value causing multiple to-be-integrated ID entries whose number exceeds a preset number to be associated with each other exists, abnormality detection is performed on each of the multiple to-be-integrated ID entries caused to be associated with each other due to the field value. The field value in the normal to-be-integrated ID entry is discarded if it is detected that the to-be-integrated ID entry is normal, and the abnormal to-be-integrated ID entry is discarded if it is detected that the to-be-integrated ID entry is abnormal.

In this embodiment, the abnormality process is performed on the to-be-integrated ID entry before the to-be-integrated ID entry is stored (that is, the to-be-integrated ID entry is integrated into the ID graph).

Specifically, in a case that the to-be-integrated data source provides to-be-integrated ID entries, if a field value causing multiple to-be-integrated ID entries whose number exceeds a preset number (for example, the preset number may be set as two, so that a case that no more than two ID entries are associated with each other is allowed) to be associated with each other exists, the to-be-integrated ID entries associated with the field value are recorded in the abnormal ID database, and abnormality detection is performed on each of the to-be-integrated ID entries associated with the field value. For example, whether each ID entry is abnormal may be artificially detected. For an ID entry that is detected to be not abnormal, the field value in the ID entry causing the ID entry to be associated with other ID entries is discarded, and the ID entry obtained after the field value is discarded is stored (integrated into the ID graph). For an ID entry that is detected to be abnormal, the abnormal ID entry is discarded and is not stored.

The following description is given by taking the following three to-be-integrated ID entries as an example.

cookie_id1, imei1, mac1;
cookie_id3, imei1, phone1;
cookie_id4, imei1.

Since a same field value imei1 is included in the three to-be-integrated ID entries, the field value imei1 causes the three ID entries to be associated with each other. In this case, the three ID entries are recorded in the abnormal ID database, and abnormality detection is performed on each of the three to-be-integrated ID entries. For an ID entry that is detected to be abnormal, the abnormal ID entry is discarded. For an ID entry that is detected to be not abnormal, the field value imei1 in the ID entry causing the ID entry to be associated with other ID entries is discarded. It is assumed that the three ID entries are detected to be not abnormal, the three ID entries obtained after the field value imei1 is discarded are stored as follows.

cookie_id1, mac1;
cookie_id3, phone1;
cookie_id4.

With the technical solutions of this embodiment, before to-be-integrated ID entries are integrated into the ID graph, abnormality detection and anomaly process can be performed on each of to-be-integrated ID entries caused to be associated with each other due to having a same field value, thereby effectively improving reference performance of the ID graph obtained by integrating the multi-data source user information.

Fourth Embodiment

Figure 4:
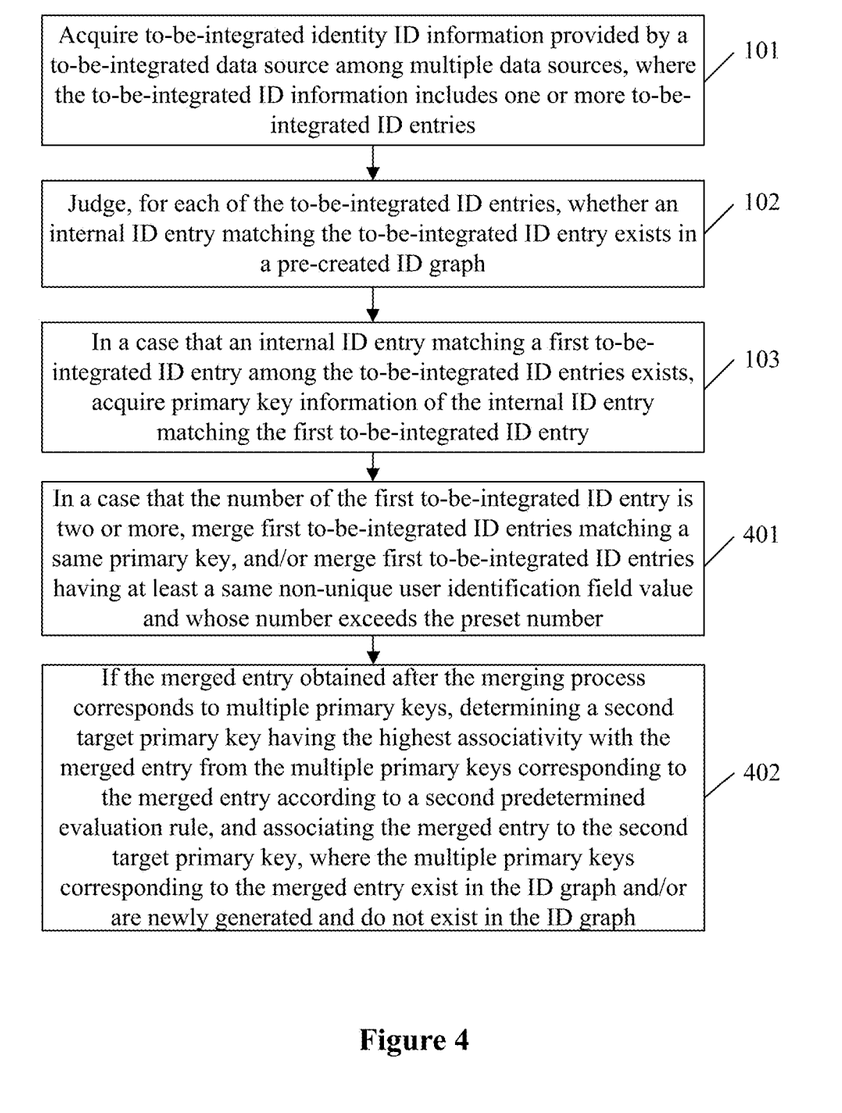
FIG. 4 is a flowchart showing a method for integrating multi-data source user information according to a fourth embodiment of the present disclosure.

In the fourth embodiment, reference is made to FIG. 4, which is a flowchart showing a method for integrating multi-data source user information. The method may further include the following steps 401 and 402 after step 103.

In step 401, in a case that the number of the first to-be-integrated ID entry is two or more, first to-be-integrated ID entries matching a same primary key are merged, and/or first to-be-integrated ID entries having at least a same non-unique user identification field value and whose number does not exceed the preset number are merged.

In step 402, if the merged entry obtained after the merging process corresponds to multiple primary keys, a second target primary key having the highest associativity with the merged entry is determined from the multiple primary keys corresponding to the merged entry according to a second predetermined evaluation rule, and the merged entry is associated to the second target primary key, where the multiple primary keys corresponding to the merged entry exist in the ID graph and/or are newly generated and does not exist in the ID graph.

In this embodiment, to-be-integrated ID entries are merged before the to-be-integrated ID entries are stored (that is, the to-be-integrated ID entries are integrated into the ID graph).

Specifically, in a case that the to-be-integrated data source provides to-be-integrated ID entries, if multiple to-be-integrated ID entries match a same primary key, and/or multiple to-be-integrated ID entries having at least a same field value and whose number does not exceed the preset number exist, the multiple to-be-integrated ID entries are merged.

The merged entry obtained after the merging process may correspond to multiple primary keys. In this case, a second target primary key having the highest associativity with the merged entry is determined from the multiple primary keys corresponding to the merged entry according to a second predetermined evaluation rule, and the merged entry is associated to the second target primary key. Specifically, in this embodiment, a second target primary key having the highest credibility is determined from the multiple primary keys corresponding to the merged entry according to a second credibility evaluation rule, as a primary key having higher associativity with the merged entry in the ID graph. That is, a primary key having high credibility among the multiple primary keys corresponding to the merged entry has high associativity with the merged entry.

Next, the merging process is illustrated by means of an example. Multiple to-be-integrated ID entries of a certain data source and primary key matching results of the ID entries in an ID graph are exemplarily shown as follows.

cookie_id1, idfa1, v_id1 (where cookie_id1 matches v_id1 in the ID graph)
cookie_id1, mac1, v_id1, v_id3 (where cookie_id1 matches v_id1, and mac1 matches v_id3)
cookie_id2, imei2, v_id2 (where v_id2 is not in the ID graph and is newly issued)
cookie_id3, phone1, v_id1 (where phone1 matches v_id1)
cookie_id4, v_id4 (where v_id4 is not in the ID graph and is newly issued)
cookie_id5, idfa1, v_id5 (where v_id5 is not in the ID graph and is newly issued)

where a field value imei1 with a strikethrough line in a second ID entry, a fourth ID entry and a fifth ID entry is discarded by the abnormality process according to the third embodiment of the present disclosure, and a first ID entry and a sixth ID entry include a same non-unique identification field value idfa1. Since the field value idfa1 causes only two ID entries to be associated with each other, and the number of the ID entries associated with each other does not exceed the preset number, it is considered that the two ID entries associated with each other are normal.

In the above example of ID entries, since the first ID entry, the second ID entry and the fourth ID entry match v_id1, the three ID entries are required to be merged. Further, since the first ID entry and the sixth ID entry include the same non-unique identification field value idfa1, the first ID entry and the sixth ID entry are required to be merged. In this case, the first ID entry, the second ID entry, the fourth ID entry and the sixth ID entry are finally merged. A merged entry obtained after the merging process and primary keys matching the merged entry are shown as follows.

cookie_id1, idfa1, mac1, cookie_id3, phone1, cookie_id5, v_id1, v_id3, v_id5.

The merged entry corresponds to three primary keys, where v_id1 and v_id3 already exist in the ID graph, and v_id5 does not exist in the ID graph and is newly issued. In this case, since the merged entry matches the primary keys already existing in the ID graph, no new primary key is required to be added for the merged entry to the ID graph. Therefore, in this embodiment, it is considered that a primary key already existing in the ID graph has the highest credibility, thus the newly issued primary key v_id5 is eliminated firstly. One of the v_id1 and v_id3 generated later than the other is selected as a final primary key matching the merged entry. It is assumed that v_id3 is generated later than v_id1, it is considered that credibility of v_id1 is lower than that of v_id3, thus v_id1 is eliminated. In this way, the merged entry and the primary key matching the merged entry are shown as follows.

cookie_id1, idfa1, mac1, cookie_id3, phone1, cookie_id5, v_id3.

In the example of the six ID entries, the following entries are finally integrated and stored according to the technical solutions of the present disclosure.

cookie_id1, idfa1, mac1, cookie_id3, phone1, cookie_id5, v_id3;

cookie_id2, imei2, v_id2;

cookie_id4, v_id4.

Figure 5:
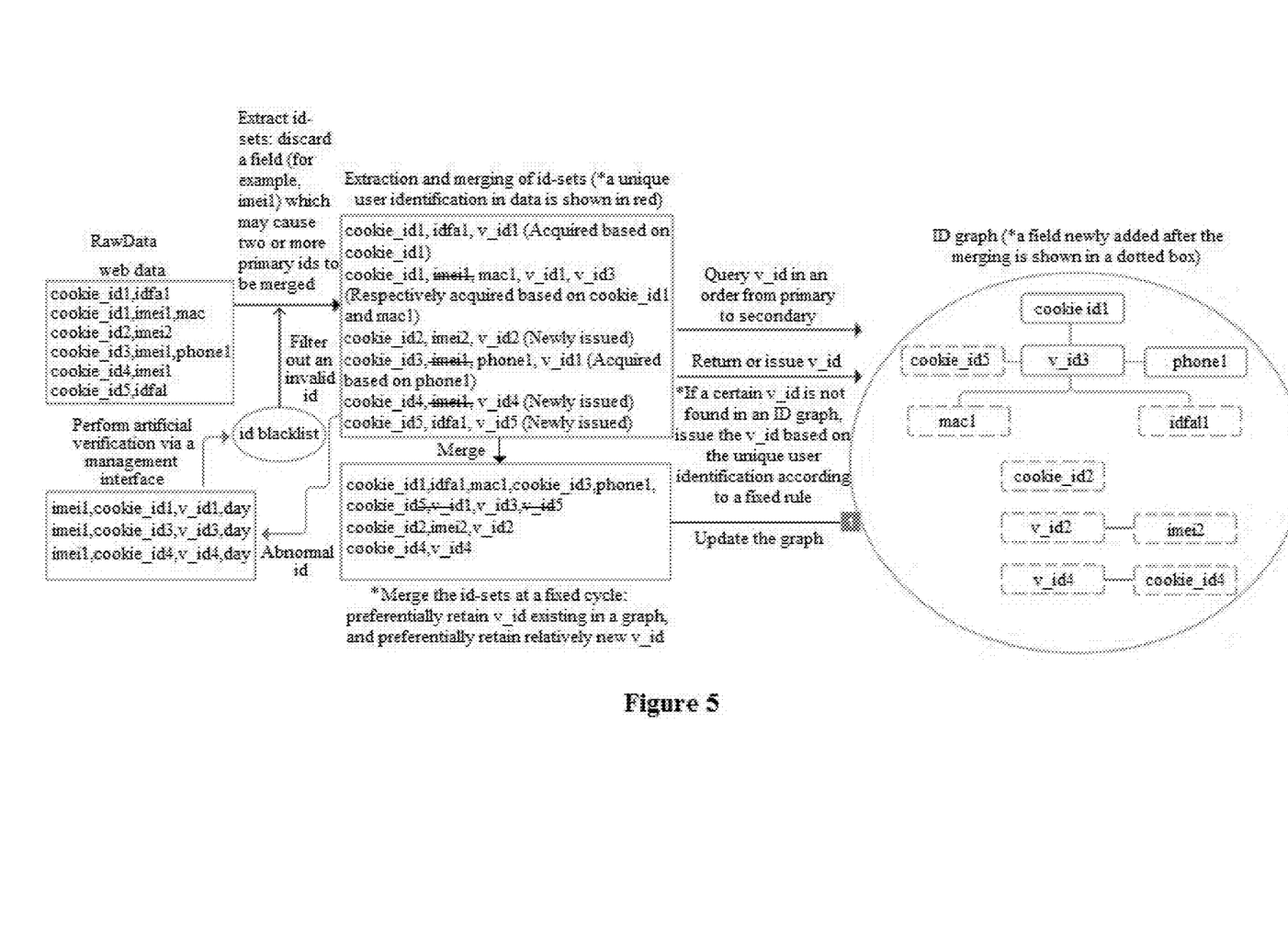
FIG. 5 is a schematic diagram showing a process that a to-be-integrated ID entry is integrated into an ID graph with technical solutions in the fourth embodiment of the present disclosure.

That is, the merged entry is associated to the primary key v_id3 in the ID graph. An already existing field value in the merged entry under v_id3 is no longer repeatedly stored. For an ID entry matching unsuccessfully, an association relationship between the ID entry and a new primary key therefor is added to the ID graph. Reference is made to FIG. 5, which shows a process that a to-be-integrated ID entry is integrated into an ID graph with the technical solutions of the present disclosure.

With the technical solutions of this embodiment, before to-be-integrated ID entries are integrated into the ID graph, the to-be-integrated ID entries associated with each other can be merged, thereby improving information integration efficiency in the storage process and reference performance of the finally obtained ID graph.

Fifth Embodiment

Figure 6:
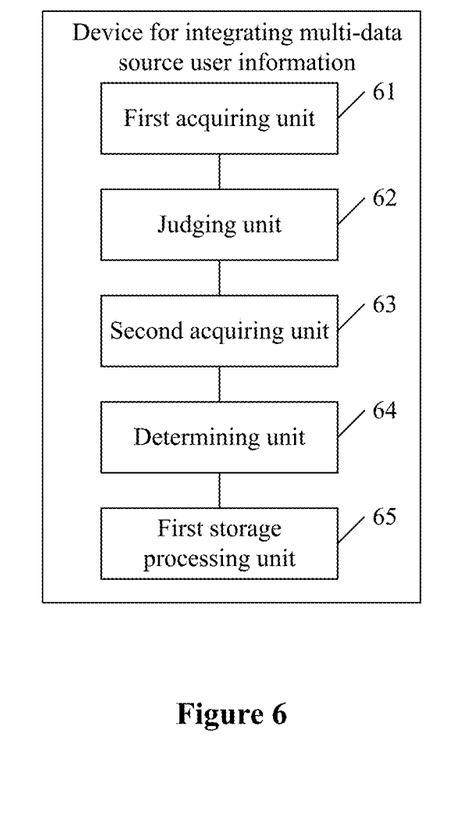
FIG. 6 is a schematic structural diagram showing a device for integrating multi-data source user information according to a fifth embodiment of the present disclosure.

In the fifth embodiment, a device for integrating multi-data source user information is provided. Reference is made to FIG. 6, which is a schematic structural diagram showing a device for integrating multi-data source user information. The device includes: a first acquiring unit 61, a judging unit 62, a second acquiring unit 63, a determining unit 64, and a first integrating unit 65.

The first acquiring unit 61 is configured to acquire to-be-integrated identity ID information provided by a to-be-integrated data source among multiple data sources. The to-be-integrated ID information includes one or more to-be-integrated ID entries. The judging unit 62 is configured to judge, for each of the to-be-integrated ID entries, whether an internal ID entry matching the to-be-integrated ID entry exists in a pre-created ID graph. The ID graph is null or includes a certain number of internal ID entries respectively associated with primary keys in a one-to-one correspondence. The second acquiring unit 63 is configured to: in a case that an internal ID entry matching a first to-be-integrated ID entry among the to-be-integrated ID entries exists, acquire primary key information of the internal ID entry matching the first to-be-integrated ID entry. The determining unit 64 is configured to: in a case that the primary key information corresponding to the first to-be-integrated ID entry includes two or more primary keys, determine a first target primary key having the highest associativity with the first to-be-integrated ID entry from the two or more primary keys according to a first predetermined evaluation rule. The first integrating unit 65 is configured to integrate the first to-be-integrated ID entry into an internal ID entry corresponding to the first target primary key having the highest associativity with the first to-be-integrated ID entry.

In an embodiment of the present disclosure, the judging unit is further configured to judge, for each of the to-be-integrated ID entries, whether an internal ID entry matching each of ID fields in the to-be-integrated ID entry exists in the ID graph based on a matching result between the ID fields in the to-be-integrated ID entry and fields in the internal ID entries in the ID graph. The ID fields in the to-be-integrated ID entry include at least a unique user identification field for identifying a unique user in the to-be-integrated data source.

In an embodiment of the present disclosure, the determining unit is further configured to determine the first target primary key having the highest credibility from the two or more primary keys according to a first credibility evaluation rule. A primary key having high credibility among multiple primary keys matching a to-be-integrated ID entry has high associativity with the to-be-integrated ID entry.

In an embodiment of the present disclosure, the device further includes a second integrating unit. The second integrating unit is configured to: in a case that no internal ID entry matching the first to-be-integrated ID entry exists, generate a new primary key for the first to-be-integrated ID entry, and add an association relationship between the first to-be-integrated ID entry and the new primary key to the ID graph.

In an embodiment of the present disclosure, the device further includes an abnormality processing unit. The abnormality processing unit is configured to: in a case that the number of the to-be-integrated ID entries is two or more, determine whether a field value causing multiple to-be-integrated ID entries whose number exceeds a preset number to be associated with each other exists in the two or more to-be-integrated ID entries, where the field value is a value of a non-unique user identification field; in a case that the field value causing multiple to-be-integrated ID entries whose number exceeds a preset number to be associated with each other exists, perform abnormality detection on each of the multiple to-be-integrated ID entries caused to be associated with each other due to the field value; and discard the field value in the normal to-be-integrated ID entry if it is detected that the to-be-integrated ID entry is normal, and discard the abnormal to-be-integrated ID entry if it is detected that the to-be-integrated ID entry is abnormal.

In an embodiment of the present disclosure, the device further includes a merging processing unit. The merging processing unit is configured to: in a case that the number of the to-be-integrated ID entry is two or more, merge to-be-integrated ID entries matching a same primary key, and/or merge to-be-integrated ID entries having at least a same non-unique user identification field value and whose number does not exceed the preset number; and if the merged entry obtained after the merging process corresponds to multiple primary keys, determine a second target primary key having the highest associativity with the merged entry from the multiple primary keys corresponding to the merged entry according to a second predetermined evaluation rule, and associate the merged entry to the second target primary key. The multiple primary keys corresponding to the merged entry exist in the ID graph and/or are newly generated and do not exist in the ID graph.

It should be noted that, the device for integrating multi-data source user information in this embodiment is similar to the method described above, and has the same advantageous effects as the method. Therefore, technical details of the device for integrating multi-data source user information not disclosed in this embodiment may refer to the description in the method embodiments, which is not repeated herein.

Embodiments in this specification are described in a progressive manner, each of the embodiments emphasizes differences from other embodiments, and the same or similar parts among the embodiments can be referred to each other.

For convenience of description, the device is described by dividing the device into modules or units by functions. The functions of the modules or units may be implemented by means of one or more software programs and/or hardware structures in implementing the present disclosure.

From the above description of the embodiments, those skilled in the art can clearly understand that the present disclosure may be implemented by means of software together with a necessary common hardware platform. Based on the above, the above technical solutions or the part contributing to the conventional technology may be implemented by a software product. The computer software product may be stored in a storage medium such as a ROM/RAM, a disk, an optical disk. The computer software product includes instructions to control a computer device (such as a personal computer, a server, or a network device) to perform methods mentioned in each of the embodiments of the present disclosure or some parts of the embodiment.

It should further be noted that the relationship terminologies such as "first", "second", "third", "fourth" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or further includes elements inherent for the process, method, article or device. Unless expressively limited otherwise, the statement "comprising (including) one . . . " does not exclude the case that other similar elements may exist in the process, method, article or device.

The above description shows only preferred embodiments of the present disclosure. It should be noted that, those skilled in the art may make various improvements and modifications to the embodiments of the present disclosure without departing from the principle of the present disclosure, and the improvements and modifications fall in the protection scope of the present disclosure.

The invention claimed is:

1. A method for integrating multi-data source user information, the method comprising:
    acquiring to-be-integrated identity ID information provided by a to-be-integrated data source among a plurality of data sources, wherein the to-be-integrated ID information comprises one or more to-be-integrated ID entries;
    judging, for each of the to-be-integrated ID entries, whether an internal ID entry matching the to-be-integrated ID entry exists in a pre-created ID graph, wherein the ID graph is null or comprises one or more internal ID entries respectively associated with primary keys in a one-to-one correspondence;
    acquiring, in a case that an internal ID entry matching a first to-be-integrated ID entry among the to-be-integrated ID entries exists, primary key information of the internal ID entry matching the first to-be-integrated ID entry;
    determining, in a case that the primary key information corresponding to the first to-be-integrated ID entry comprises two or more primary keys, a first target primary key having the highest associativity with the first to-be-integrated ID entry from the two or more primary keys according to a first predetermined evaluation rule; and
    integrating the first to-be-integrated ID entry into an internal ID entry corresponding to the first target primary key.

2. The method according to claim 1, wherein each of the to-be-integrated ID entries at least comprises a unique user identification field for identifying a unique user in the to-be-integrated data source, and the judging, for each of the to-be-integrated ID entries, whether an internal ID entry matching the to-be-integrated ID entry exists in a pre-created ID graph comprises:
    judging, for each of the to-be-integrated ID entries, whether an internal ID entry matching the to-be-integrated ID entry exists in the ID graph based on a matching result between ID fields in the to-be-integrated ID entry and fields in the internal ID entries in the ID graph, wherein the ID fields in the to-be-integrated ID entry comprise at least the unique user identification field for identifying a unique user in the to-be-integrated data source.

3. The method according to claim 2, wherein each of the to-be-integrated ID entries at least comprises a unique user identification field for identifying a unique user in the to-be-integrated data source, and before judging, for each of the to-be-integrated ID entries, whether an internal ID entry matching the to-be-integrated ID entry exists in a pre-created ID graph, the method further comprises:
    determining, in a case that the number of the to-be-integrated ID entries is two or more, whether a field value causing a plurality of to-be-integrated ID entries whose number exceeds a preset number to be associated with each other exists in the two or more to-be-integrated ID entries, wherein the field value is a value of a non-unique user identification field; and
    in a case that the field value causing a plurality of to-be-integrated ID entries whose number exceeds a preset number to be associated with each other exists,
        performing abnormality detection on each of the plurality of to-be-integrated ID entries caused to be associated with each other due to the field value; and
        discarding, if it is detected that the to-be-integrated ID entry is normal, the field value in the normal to-be-integrated ID entry, and discarding, if it is detected that the to-be-integrated ID entry is abnormal, the abnormal to-be-integrated ID entry.

4. The method according to claim 3, wherein after acquiring the primary key information of the internal ID entry matching the first to-be-integrated ID entry, the method further comprises:
    in a case that the number of the first to-be-integrated ID entry is two or more, merging first to-be-integrated ID entries matching a same primary key, and/or merging first to-be-integrated ID entries having at least a same non-unique user identification field value and whose number does not exceed the preset number; and
    if the merged entry obtained after the merging process corresponds to a plurality of primary keys, determining a second target primary key having the highest associativity with the merged entry from the plurality of primary keys corresponding to the merged entry according to a second predetermined evaluation rule, and associating the merged entry to the second target primary key, wherein the plurality of primary keys corresponding to the merged entry exists in the ID graph and/or is newly generated and does not exist in the ID graph.

5. The method according to claim 1, wherein determining the first target primary key having the highest associativity with the first to-be-integrated ID entry from the two or more primary keys according to the first predetermined evaluation rule comprises:

determining the first target primary key having the highest credibility from the two or more primary keys according to a first credibility evaluation rule, wherein a primary key having high credibility among a plurality of primary keys matching a to-be-integrated ID entry has high associativity with the to-be-integrated ID entry.

6. The method according to claim 5, wherein each of the to-be-integrated ID entries at least comprises a unique user identification field for identifying a unique user in the to-be-integrated data source, and before judging, for each of the to-be-integrated ID entries, whether an internal ID entry matching the to-be-integrated ID entry exists in a pre-created ID graph, the method further comprises:

determining, in a case that the number of the to-be-integrated ID entries is two or more, whether a field value causing a plurality of to-be-integrated ID entries whose number exceeds a preset number to be associated with each other exists in the two or more to-be-integrated ID entries, wherein the field value is a value of a non-unique user identification field; and in a case that the field value causing a plurality of to-be-integrated ID entries whose number exceeds a preset number to be associated with each other exists, performing abnormality detection on each of the plurality of to-be-integrated ID entries caused to be associated with each other due to the field value; and discarding, if it is detected that the to-be-integrated ID entry is normal, the field value in the normal to-be-integrated ID entry, and discarding, if it is detected that the to-be-integrated ID entry is abnormal, the abnormal to-be-integrated ID entry.

7. The method according to claim 6, wherein after acquiring the primary key information of the internal ID entry matching the first to-be-integrated ID entry, the method further comprises:

in a case that the number of the first to-be-integrated ID entry is two or more, merging first to-be-integrated ID entries matching a same primary key, and/or merging first to-be-integrated ID entries having at least a same non-unique user identification field value and whose number does not exceed the preset number; and if the merged entry obtained after the merging process corresponds to a plurality of primary keys, determining a second target primary key having the highest associativity with the merged entry from the plurality of primary keys corresponding to the merged entry according to a second predetermined evaluation rule, and associating the merged entry to the second target primary key, wherein the plurality of primary keys corresponding to the merged entry exists in the ID graph and/or is newly generated and does not exist in the ID graph.

8. The method according to claim 1, further comprising:
generating a new primary key for the first to-be-integrated ID entry in a case that no internal ID entry matching the first to-be-integrated ID entry exists; and adding an association relationship between the first to-be-integrated ID entry and the new primary key to the ID graph.

9. The method according to claim 8, wherein each of the to-be-integrated ID entries at least comprises a unique user identification field for identifying a unique user in the to-be-integrated data source, and before judging, for each of the to-be-integrated ID entries, whether an internal ID entry matching the to-be-integrated ID entry exists in a pre-created ID graph, the method further comprises:

determining, in a case that the number of the to-be-integrated ID entries is two or more, whether a field value causing a plurality of to-be-integrated ID entries whose number exceeds a preset number to be associated with each other exists in the two or more to-be-integrated ID entries, wherein the field value is a value of a non-unique user identification field; and in a case that the field value causing a plurality of to-be-integrated ID entries whose number exceeds a preset number to be associated with each other exists, performing abnormality detection on each of the plurality of to-be-integrated ID entries caused to be associated with each other due to the field value; and discarding, if it is detected that the to-be-integrated ID entry is normal, the field value in the normal to-be-integrated ID entry, and discarding, if it is detected that the to-be-integrated ID entry is abnormal, the abnormal to-be-integrated ID entry.

10. The method according to claim 9, wherein after acquiring the primary key information of the internal ID entry matching the first to-be-integrated ID entry, the method further comprises:

in a case that the number of the first to-be-integrated ID entry is two or more, merging first to-be-integrated ID entries matching a same primary key, and/or merging first to-be-integrated ID entries having at least a same non-unique user identification field value and whose number does not exceed the preset number; and if the merged entry obtained after the merging process corresponds to a plurality of primary keys, determining a second target primary key having the highest associativity with the merged entry from the plurality of primary keys corresponding to the merged entry according to a second predetermined evaluation rule, and associating the merged entry to the second target primary key, wherein the plurality of primary keys corresponding to the merged entry exists in the ID graph and/or is newly generated and does not exist in the ID graph.

11. The method according to claim 1, wherein each of the to-be-integrated ID entries at least comprises a unique user identification field for identifying a unique user in the to-be-integrated data source, and before judging, for each of the to-be-integrated ID entries, whether an internal ID entry matching the to-be-integrated ID entry exists in a pre-created ID graph, the method further comprises:

determining, in a case that the number of the to-be-integrated ID entries is two or more, whether a field value causing a plurality of to-be-integrated ID entries whose number exceeds a preset number to be associated with each other exists in the two or more to-be-integrated ID entries, wherein the field value is a value of a non-unique user identification field; and in a case that the field value causing a plurality of to-be-integrated ID entries whose number exceeds a preset number to be associated with each other exists, performing abnormality detection on each of the plurality of to-be-integrated ID entries caused to be associated with each other due to the field value; and discarding, if it is detected that the to-be-integrated ID entry is normal, the field value in the normal to-be-integrated ID entry, and discarding, if it is detected that the to-be-integrated ID entry is abnormal, the abnormal to-be-integrated ID entry.

12. The method according to claim 11, wherein after acquiring the primary key information of the internal ID entry matching the first to-be-integrated ID entry, the method further comprises:
- in a case that the number of the first to-be-integrated ID entry is two or more, merging first to-be-integrated ID entries matching a same primary key, and/or merging first to-be-integrated ID entries having at least a same non-unique user identification field value and whose number does not exceed the preset number; and
- if the merged entry obtained after the merging process corresponds to a plurality of primary keys, determining a second target primary key having the highest associativity with the merged entry from the plurality of primary keys corresponding to the merged entry according to a second predetermined evaluation rule, and associating the merged entry to the second target primary key, wherein the plurality of primary keys corresponding to the merged entry exists in the ID graph and/or is newly generated and does not exist in the ID graph.

13. A device for integrating multi-data source user information, the device comprising:
- a first acquiring unit configured to acquire to-be-integrated ID information provided by a to-be-integrated data source among a plurality of data sources, wherein the to-be-integrated ID information comprises one or more to-be-integrated ID entries;
- a judging unit configured to judge, for each of the to-be-integrated ID entries, whether an internal ID entry matching the to-be-integrated ID entry exists in a pre-created ID graph, wherein the ID graph is null or comprises one or more internal ID entries respectively associated with primary keys in a one-to-one correspondence;
- a second acquiring unit configured to: in a case that an internal ID entry matching a first to-be-integrated ID entry among the to-be-integrated ID entries exists, acquire primary key information of the internal ID entry matching the first to-be-integrated ID entry;
- a determining unit configured to: in a case that the primary key information corresponding to the first to-be-integrated ID entry comprises two or more primary keys, determine a first target primary key having the highest associativity with the first to-be-integrated ID entry from the two or more primary keys according to a first predetermined evaluation rule; and
- a first integrating unit configured to integrate the first to-be-integrated ID entry into an internal ID entry corresponding to the first target primary key.

14. The device according to claim 13, wherein each of the to-be-integrated ID entries at least comprises a unique user identification field for identifying a unique user in the to-be-integrated data source, and the judging unit is further configured to:
- judge, for each of the to-be-integrated ID entries, whether an internal ID entry matching the to-be-integrated ID entry exists in the ID graph based on a matching result between ID fields in the to-be-integrated ID entry and fields in the internal ID entries in the ID graph, wherein the ID fields in the to-be-integrated ID entry comprise at least the unique user identification field for identifying a unique user in the to-be-integrated data source.

15. The device according to claim 13, wherein the determining unit is further configured to:
- determine the first target primary key having the highest credibility from the two or more primary keys according to a first credibility evaluation rule, wherein a primary key having high credibility among a plurality of primary keys matching a to-be-integrated ID entry has high associativity with the to-be-integrated ID entry.

16. The device according to claim 13, further comprising:
- a second integrating unit configured to: in a case that no internal ID entry matching the first to-be-integrated ID entry exists, generate a new primary key for the first to-be-integrated ID entry, and add an association relationship between the first to-be-integrated ID entry and the new primary key to the ID graph.

* * * * *